(12) United States Patent
Tomsa

(10) Patent No.: US 11,938,810 B2
(45) Date of Patent: Mar. 26, 2024

(54) SYSTEMS FOR LOW FRICTION TRANSMISSION

(71) Applicant: GM GLOBAL TECHNOLOGY OPERATIONS LLC, Detroit, MI (US)

(72) Inventor: Peter Tomsa, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 60 days.

(21) Appl. No.: 17/814,816

(22) Filed: Jul. 25, 2022

(65) Prior Publication Data

US 2024/0025248 A1    Jan. 25, 2024

(51) Int. Cl.
*B60K 17/16* (2006.01)
*B60K 17/12* (2006.01)
*B60K 17/22* (2006.01)

(52) U.S. Cl.
CPC .............. *B60K 17/12* (2013.01); *B60K 17/16* (2013.01); *B60K 17/22* (2013.01)

(58) Field of Classification Search
CPC .......... F16H 1/22; F16H 37/08; F16H 57/037; F16H 37/0833; F16H 37/0806; B60K 17/16; H02K 7/006; H02K 7/116
USPC ..................... 74/665 GD, 392, 410, 409, 413
See application file for complete search history.

(56) References Cited

U.S. PATENT DOCUMENTS

| | | | | |
|---|---|---|---|---|
| 1,143,617 A * | 6/1915 | Ehrlich | ..................... | F16H 1/22 74/410 |
| 1,293,047 A * | 2/1919 | Davies | ..................... | F16H 1/22 74/410 |
| 1,302,963 A * | 5/1919 | Parsons et al. | ........... | F16H 1/22 74/410 |
| 1,459,026 A * | 6/1923 | Kocher | ................... | F16H 37/08 475/203 |
| 1,874,153 A * | 8/1932 | Austin | .................... | F16H 37/08 74/366 |
| 2,203,282 A * | 6/1940 | Keese | ................... | F16H 57/037 180/250 |
| 2,241,606 A * | 5/1941 | Kysor | .................... | F16H 37/08 74/424 |
| 8,441,161 B2 * | 5/2013 | Makino | ................... | B60K 1/00 310/78 |

FOREIGN PATENT DOCUMENTS

JP    2019100409 A *    6/2019    ............... F16H 1/08

* cited by examiner

Primary Examiner — Thomas C Diaz
(74) Attorney, Agent, or Firm — Lorenz & Kopf LLP

(57) ABSTRACT

A transmission system for a vehicle includes a first helical pinion gear having a helix angle coupled to a first shaft and configured to receive an input torque. The transmission system includes a second helical pinion gear having a first helix angle coupled to a second shaft and configured to receive the input torque. The second shaft is disposed within the first shaft and rotatable within the first shaft. The transmission system includes a differential assembly having a third helical gear having the first helix angle coupled to the first helical pinion gear, and a fourth helical gear having the helix angle coupled to the second helical pinion gear. The third helical gear and the fourth helical gear are coupled to a differential gear set to drive a first output shaft and a second output shaft associated with the vehicle.

20 Claims, 6 Drawing Sheets

SYSTEMS FOR LOW FRICTION TRANSMISSION

INTRODUCTION

The technical field generally relates to systems for a transmission of a vehicle, and more particularly relates to systems for a low friction transmission for a battery electric vehicle.

In the example of a battery electric vehicle, a transmission transmits power from an electric motor to wheels associated with the battery electric vehicle. In certain instances, the transmission may include one or more gears and shafts, which cooperate to transfer torque from the electric motor to the wheels at various speeds. In these instances, the gears and shafts may generate mechanical friction, which may require the use of additional torque from the electric motor to drive the gears and shafts. The use of additional torque may decrease a range of the battery electric vehicle, or may require the use of additional or larger capacity batteries to supply power to the electric motor.

Accordingly, it is desirable to provide systems for a low friction transmission for a battery electric vehicle, in which a friction within the transmission is reduced, thereby increasing a range of the battery electric vehicle or enabling a reduction in capacity of the batteries associated with the battery electric vehicle. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a transmission system for a vehicle. The transmission system includes a first helical pinion gear having a helix angle coupled to a first shaft and configured to receive an input torque. The transmission system includes a second helical pinion gear having a first helix angle coupled to a second shaft and configured to receive the input torque. The second shaft is disposed within the first shaft and rotatable within the first shaft. The transmission system includes a differential assembly having a third helical gear having the first helix angle coupled to the first helical pinion gear, and a fourth helical gear having the helix angle coupled to the second helical pinion gear. The third helical gear and the fourth helical gear are coupled to a differential gear set to drive a first output shaft and a second output shaft associated with the vehicle.

The input shaft assembly is coupled to a propulsion system associated with the vehicle, and the input shaft assembly is configured to provide the input torque. The first shaft includes a first helical gear coupled to the input shaft assembly to receive the input torque, and the first helical gear has the helix angle. The input shaft assembly includes an input shaft and an output shaft, and the input shaft includes a third helical pinion gear having the first helix angle coupled to the first helical gear. The second shaft includes a second helical gear coupled to the input shaft assembly to receive the input torque, and the second helical gear has the helix angle. The input shaft assembly includes an input shaft and an output shaft, and the input shaft includes a fourth helical pinion gear having the helix angle coupled to the second helical gear. The input shaft assembly includes an input shaft disposed within an output shaft, the output shaft is associated with the propulsion system of the vehicle, and the input shaft is configured to rotate with the output shaft at the same speed as the input shaft. The input shaft includes a third helical pinion gear having the helix angle and a fourth helical pinion gear having the first helix angle. The input shaft includes a plurality of splines that engage a central bore of the output shaft to couple the input shaft to the output shaft. The helix angle and the first helix angle are opposite and equal angles.

Also provided is a vehicle. The vehicle includes a propulsion system having an output shaft. The vehicle includes a transmission system. The transmission system includes an input shaft assembly coupled to the output shaft, and a transfer shaft assembly coupled to the input shaft assembly. The transfer shaft assembly includes a first transfer shaft having a first helical gear configured to be driven by the input shaft assembly and a first helical pinion gear, and a second transfer shaft having a second helical gear configured to be driven by the input shaft assembly and a second helical pinion gear. The first helical gear and the first helical pinion gear have a helix angle, and the second helical gear and the second helical pinion gear have a first helix angle. The transmission system includes a differential assembly coupled to the transfer shaft assembly. The differential assembly includes a third helical gear and a fourth helical gear coupled to a differential gear set. The third helical gear is configured to be driven by the first helical pinion gear and the fourth helical gear is configured to be driven by the second helical pinion gear, and the differential gear set configured to drive a first output shaft and a second output shaft.

The helix angle and the first helix angle are opposite and equal angles. The third helical gear has the first helix angle and the fourth helical gear has the helix angle. The input shaft assembly includes an input shaft disposed within the output shaft, and the input shaft is configured to rotate with the output shaft at the same speed as the input shaft. The input shaft is coupled to the output shaft at a coupling point to transfer power from the output shaft to the input shaft. The input shaft includes a third helical pinion gear having the helix angle and a fourth helical pinion gear having the first helix angle. The third helical pinion gear is configured to drive the first helical gear. The fourth helical pinion gear is configured to drive the second helical gear. The input shaft includes a plurality of splines that engage a central bore of the output shaft to couple the input shaft for rotation with the output shaft. The second transfer shaft is positioned within a central transfer bore of the first transfer shaft.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
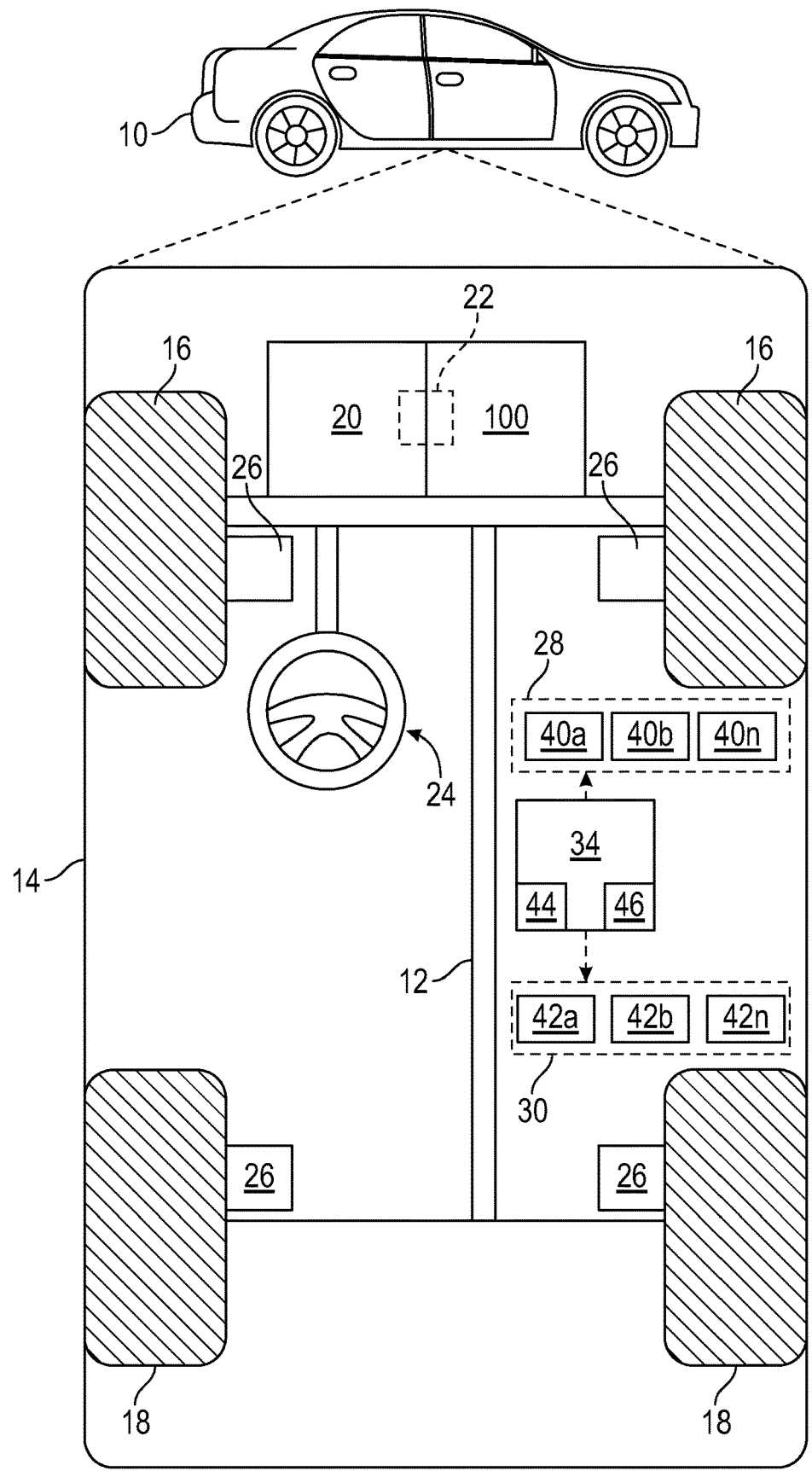
FIG. 1 is a functional block diagram illustrating a vehicle including a low friction transmission system in accordance with various embodiments.

With reference to FIG. 1, a low friction transmission system shown generally as 100 is associated with a vehicle 10 in accordance with various embodiments. In one example, the vehicle 10 is a battery electric vehicle, however, it should be understood that the following disclosure may be applicable to other electric motor driven devices. As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The vehicle wheels 16-18 are each rotationally coupled to the chassis 12 near a respective corner of the body 14. In various embodiments, the vehicle 10 is an autonomous vehicle or a semi-autonomous vehicle. As can be appreciated, the low friction transmission system 100 can be implemented in other non-autonomous systems and is not limited to the present embodiments. The vehicle 10 is depicted in the illustrated embodiment as a battery electric passenger car, but it should be appreciated that any other vehicle, including motorcycles, trucks, sport utility vehicles (SUVs), recreational vehicles (RVs), etc., can also be used.

As shown, the vehicle 10 generally includes a propulsion system 20, the low friction transmission system 100, a steering system 24, a brake system 26, a sensor system 28, an actuator system 30 and at least one controller 34. The propulsion system 20 may, in various embodiments, include an electric machine such as an electric motor or traction motor. The propulsion system 20 has an output shaft or outer shaft 22, which is coupled to the low friction transmission system 100.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 24a for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. In various embodiments, the sensing devices 40a-40n include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter. The sensor system 28 is in communication with the controller 34 over a communication medium.

The actuator system 30 includes one or more actuator devices 42a-42n that control one or more vehicle features such as, but not limited to, the propulsion system 20, the steering system 24, and the brake system 26. In various embodiments, the vehicle 10 may also include interior and/or exterior vehicle features not illustrated in FIG. 1, such as various doors, a trunk, and cabin features such as air, music, lighting, touch-screen display components, active safety seat or haptic seat, and the like.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keepalive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

Figure 2:
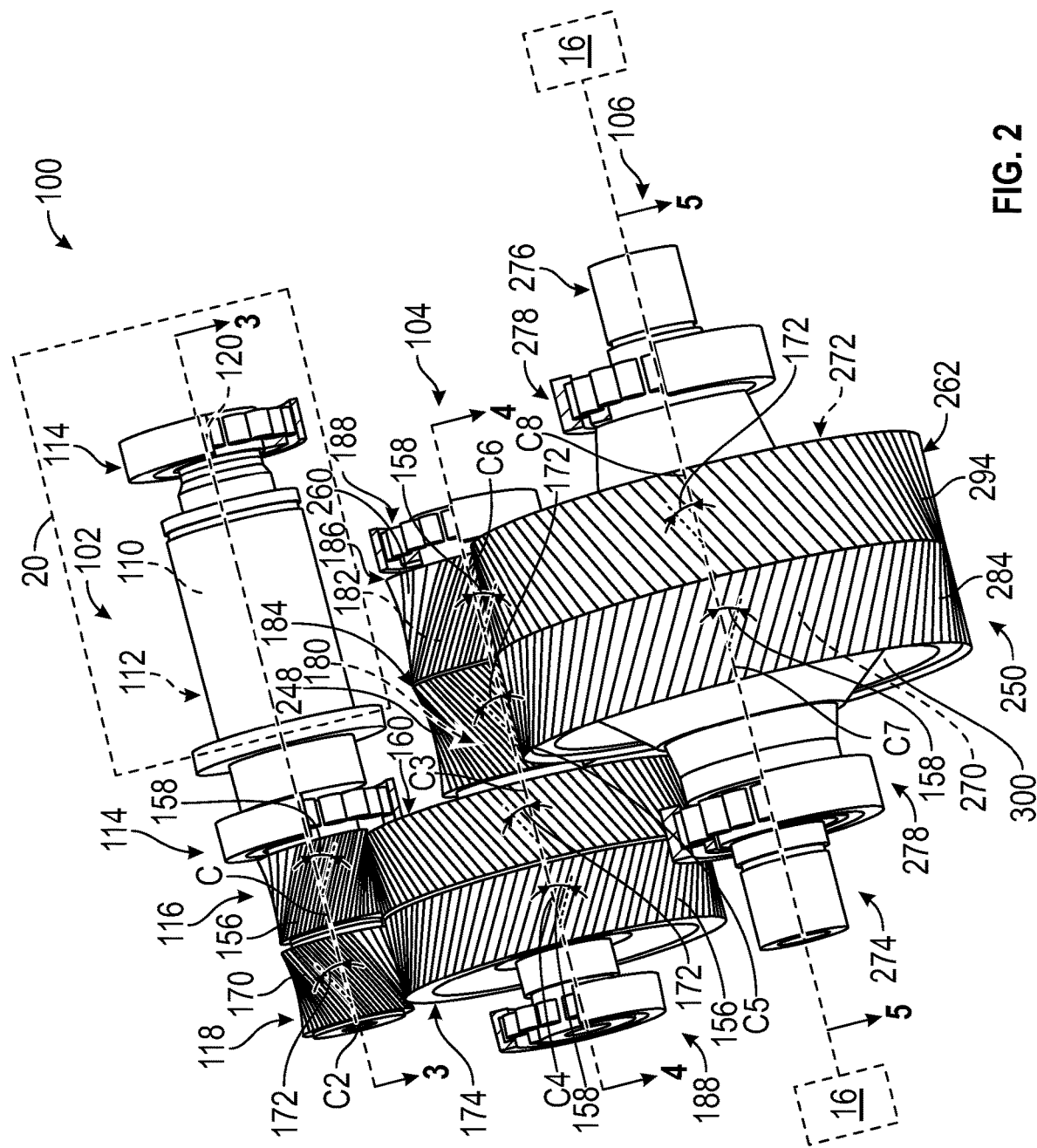
FIG. 2 is a perspective schematic view of the low friction transmission system in accordance with various embodiments, in which bearings associated with the low friction transmission system are shown partially cross-sectioned.

With reference to FIG. 2, the low friction transmission system 100 is shown in greater detail. In one example, the low friction transmission system 100 includes an input shaft assembly 102, a transfer shaft assembly 104 and a differential assembly 106. The low friction transmission system 100 may also include a housing to enclose the components of the low friction transmission system 100. The input shaft assembly 102 receives input torque from the propulsion system 20. In one example, the input shaft assembly 102 includes an input shaft or inner shaft 110, the outer shaft 22, one or more bearings 114, a first pinion gear 116, a second pinion gear 118 and a coupling system 120.

Figure 3:
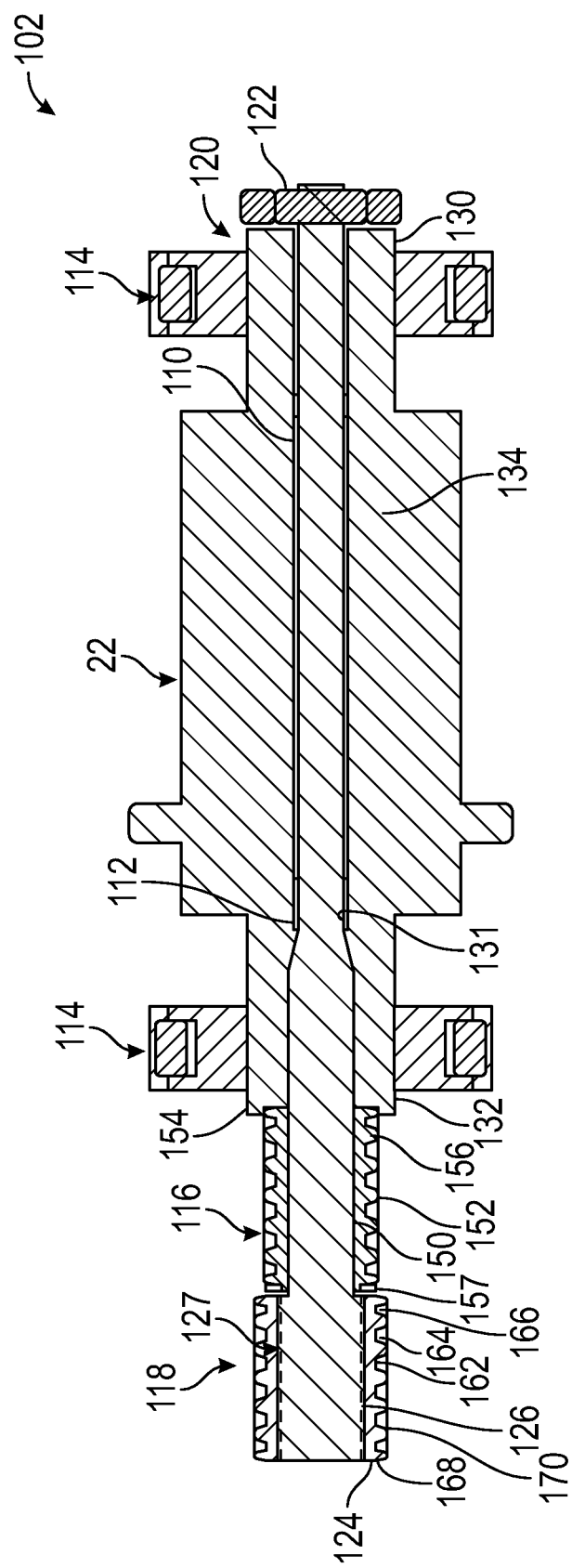
FIG. 3 is a cross-sectional view of an input shaft assembly of the low friction transmission system, taken along line 3-3 of FIG. 2.

With reference to FIG. 3, a cross-section of the input shaft assembly 102 is shown. The inner shaft 110 is coupled to the outer shaft 22 by the coupling system 120 so as to rotate at the same speed as the outer shaft 22. In one example, the inner shaft 110, the outer shaft 22, a first transfer shaft or outer transfer shaft 180 and a second transfer shaft or inner transfer shaft 182 of the transfer shaft assembly 104, and a first output shaft 274 and a second output shaft 276 of the differential assembly 106 are torsionally tuned, which cooperates with the remainder of the low friction transmission system 100 to enable axial loads acting on the low friction transmission system 100 to be substantially canceled or eliminated. By canceling the axial loads, the mechanical friction associated with the low friction transmission system 100 is greatly reduced, which improves an operating efficiency of the propulsion system 20 and of the low friction transmission system 100. In one example, finite element analysis is performed based on the predetermined output torque needed for the predetermined angle of rotation of output shafts 274, 276 of the differential assembly 106, given the arrangement of the input shaft assembly 102 and the transfer shaft assembly 104. The finite element analysis determines a coupling point 112 for the inner shaft 110 and the outer shaft 22, which results in a cancelation of axial loads acting on the input shaft assembly 102, the transfer shaft assembly 104 and the differential assembly 106. Generally, the torsional rigidity of the inner shaft 110 and the outer shaft 22 at the coupling point 112 is the same as the torsional rigidity at a first helical differential gear 250 and a second helical differential gear 262 of the differential assembly 106. By providing the torsional rigidity the same at the coupling point 112 between the inner shaft 110 and the outer shaft 22, and the first helical differential gear 250 and the second helical differential gear 262 of the differential assembly 106, the axial load acting on the input shaft assembly 102, the transfer shaft assembly 104 and the differential assembly 106 is canceled by opposing helical gear teeth on the respective ones of the first pinion gear 116, the second pinion gear 118, a first helical gear 160, a second helical gear 174, a first transfer pinion 184, a second transfer pinion 186, the first helical differential gear 250 and the second helical differential gear 262 as will be discussed. In one example, the coupling point 112 is defined proximate one of the bearings 114. It should be noted that in other examples, the torsional tuning of the low friction transmission system 100 may result in the inner shaft 110 being coupled to the outer shaft 22 at a different location along the length of the inner shaft 110. The coupling point 112 is a point where power splits from the outer shaft 22 to the inner shaft 110.

The inner shaft 110 is cylindrical, and may be hollow. The inner shaft 110 is composed of a metal or metal alloy, and may be forged, extruded, cast, etc. Generally, the inner shaft 110 and the outer shaft 22 are each composed of a metal or metal alloy, including, but not limited to, shaft steel. The inner shaft 110 includes a first input shaft end 122 and an opposite second input shaft end 124. The first input shaft end 122 is coupled to the coupling system 120 and is supported by one of the bearings 114 for rotation with the outer shaft 22. The second pinion gear 118 is coupled at the second input shaft end 124. In one example, the second input shaft end 124 includes a plurality of pinion splines 126, which engage with a plurality of mating pinion splines 127 defined within the second pinion gear 118.

In this example, the inner shaft 110 is received within the outer shaft 22 such that the outer shaft 22 surrounds a portion of the inner shaft 110, and the second input shaft end 124 extends beyond the outer shaft 22. At the second input shaft end 124, the inner shaft 110 includes the plurality of pinion splines 126. The plurality of pinion splines 126 couple the second pinion gear 118 to the inner shaft 110. The second pinion gear 118 may include a plurality of mating pinion splines 127, which engage with the pinion splines 126 of the inner shaft 110 to couple the second pinion gear 118 to the inner shaft 110. Generally, the outer shaft 22 driven by the propulsion system 20 drives both the first pinion gear 116 and the second pinion gear 118 at the same speed and torque as the inner shaft 110. It should be noted that in other embodiments, the second pinion gear 118 may be coupled to the inner shaft 110 via locking tapers, etc.

In this example, the inner shaft 110 also includes a plurality of shaft splines 131. The shaft splines 131 are defined on the inner shaft 110 at the coupling point 112. In this example, the shaft splines 131 are defined on the inner shaft 110 proximate, but spaced a distance apart from, the second input shaft end 124. A central bore 134 of the outer shaft 22 is substantially smooth. The coupling of the inner shaft 110 to the outer shaft 22 with the coupling system 120 causes the shaft splines 131 to form grooves in the central bore 134 of the outer shaft 22, thereby fixedly coupling the inner shaft 110 to the outer shaft 22 at the coupling point 112 such that the inner shaft 110 and the outer shaft 22 rotate together. The outer shaft 22 includes a first output shaft end 130 and an opposite second output shaft end 132. The outer shaft 22 also defines the central bore 134 from the first output shaft end 130 to the second output shaft end 132, which is coupled to the inner shaft 110.

In this example, the input shaft assembly 102 includes two bearings 114. One of the bearings 114 is coupled to the outer shaft 22 adjacent or at the first output shaft end 130, and the other bearing 114 is coupled to the outer shaft 22 adjacent to or at the second output shaft end 132. The bearings 114 support the outer shaft 22 for rotation. In this example, the bearings 114 are each roller bearings, however, any bearing may be employed, including, but not limited to ball bearings, etc. The bearings 114 may be coupled to the housing associated with the low friction transmission system 100.

The first pinion gear 116 is coupled to the outer shaft 22. The first pinion gear 116 is composed of a metal or metal alloy, and may be forged, cast, additively manufactured, etc. The first pinion gear 116 has a first pinion inner diameter 150 and a first pinion outer diameter 152. The first pinion inner diameter 150 is positioned about the inner shaft 110. In one example, the first pinion gear 116 includes a first pinion end 154 opposite a second pinion end 157. The first pinion end 154 is coupled to the outer shaft 22 such that the first pinion gear 116 is driven by the outer shaft 22, and the second pinion end 157 is spaced apart from the second pinion gear 118. In one example, the first pinion gear 116 is a helical gear, and has a plurality of helical gear teeth 156 defined on the first pinion outer diameter 152. With reference back to FIG. 2, the first pinion gear 116 has a center axis C, and the helical gear teeth 156 are arranged at a first helix angle 158 defined between the center axis C and a line tangent to one tooth of the plurality of helical gear teeth 156. In this example, the first helix angle 158 is about negative 10 degrees to negative 50 degrees. The first pinion gear 116 is driven by the outer shaft 22, and drives the first helical gear 160 of the transfer shaft assembly 104.

The second pinion gear 118 is coupled to the inner shaft 110. The second pinion gear 118 is composed of a metal or metal alloy, and may be forged, cast, additively manufactured, etc. The second pinion gear 118 has a second pinion inner diameter 162 and a second pinion outer diameter 164. The second pinion gear 118 also has a first pinion end 166 opposite a second pinion end 168. The second pinion inner diameter 162 defines a central bore that extends from the first pinion end 166 to the second pinion end 168, which includes the plurality of mating pinion splines 127. In one example, the second pinion gear 118 is a helical gear, and has a plurality of second helical gear teeth 170 defined on the second pinion outer diameter 164. With reference back to FIG. 2, the second pinion gear 118 has a center axis C2, and the second helical gear teeth 170 are arranged at a second helix angle 172 defined between the center axis C2 and a line tangent to one tooth of the plurality of second helical gear teeth 170. In this example, the second helix angle 172 is degrees to 50 degrees, and the second helix angle 172 is opposite and equal to the first helix angle 158. For example, if the first helix angle 158 is negative 45 degrees, then the second helix angle 172 is 45 degrees. By providing the second helix angle 172 opposite and equal to the first helix angle 158, an axial load acting on the input shaft assembly 102 is reduced or canceled due to the opposite orientation of the first helix angle 158 and the second helix angle 172, and the torsional tuning of the inner shaft 110 and the outer shaft 22. By eliminating or canceling the axial load acting on the input shaft assembly 102, the first pinion gear 116 and the second pinion gear 118 reduce mechanical friction associated with the input shaft assembly 102. The second pinion gear 118 is driven by the inner shaft 110, and drives the second helical gear 174 of the transfer shaft assembly 104.

The coupling system 120 secures the inner shaft 110 to the outer shaft 22 at the coupling point 112 so that the inner shaft 110 rotates at the same speed as the outer shaft 22 and the same torque is transferred from the inner shaft 110 to each of the first pinion gear 116 and the second pinion gear 118. In one example, the coupling system 120 is a lock nut, however, other techniques may be used to couple the inner shaft 110 to the outer shaft 22, including, but not limited to, swaging, etc. Generally, the coupling system 120 creates a press-fit between the inner shaft 110 and the outer shaft 22, which causes the shaft splines 131 to engage with the central bore 134 of the outer shaft 22 to couple the inner shaft 110 to the outer shaft 22.

The transfer shaft assembly 104 is coupled between the input shaft assembly 102 and the differential assembly 106. The transfer shaft assembly 104 transfers speed and torque from the input shaft assembly 102 to the differential assembly 106. In one example, the transfer shaft assembly 104 includes the first helical gear 160, the second helical gear 174, the outer transfer shaft 180, the inner transfer shaft 182, the first transfer pinion 184, the second transfer pinion 186 and one or more bearings 188.

Figure 4:
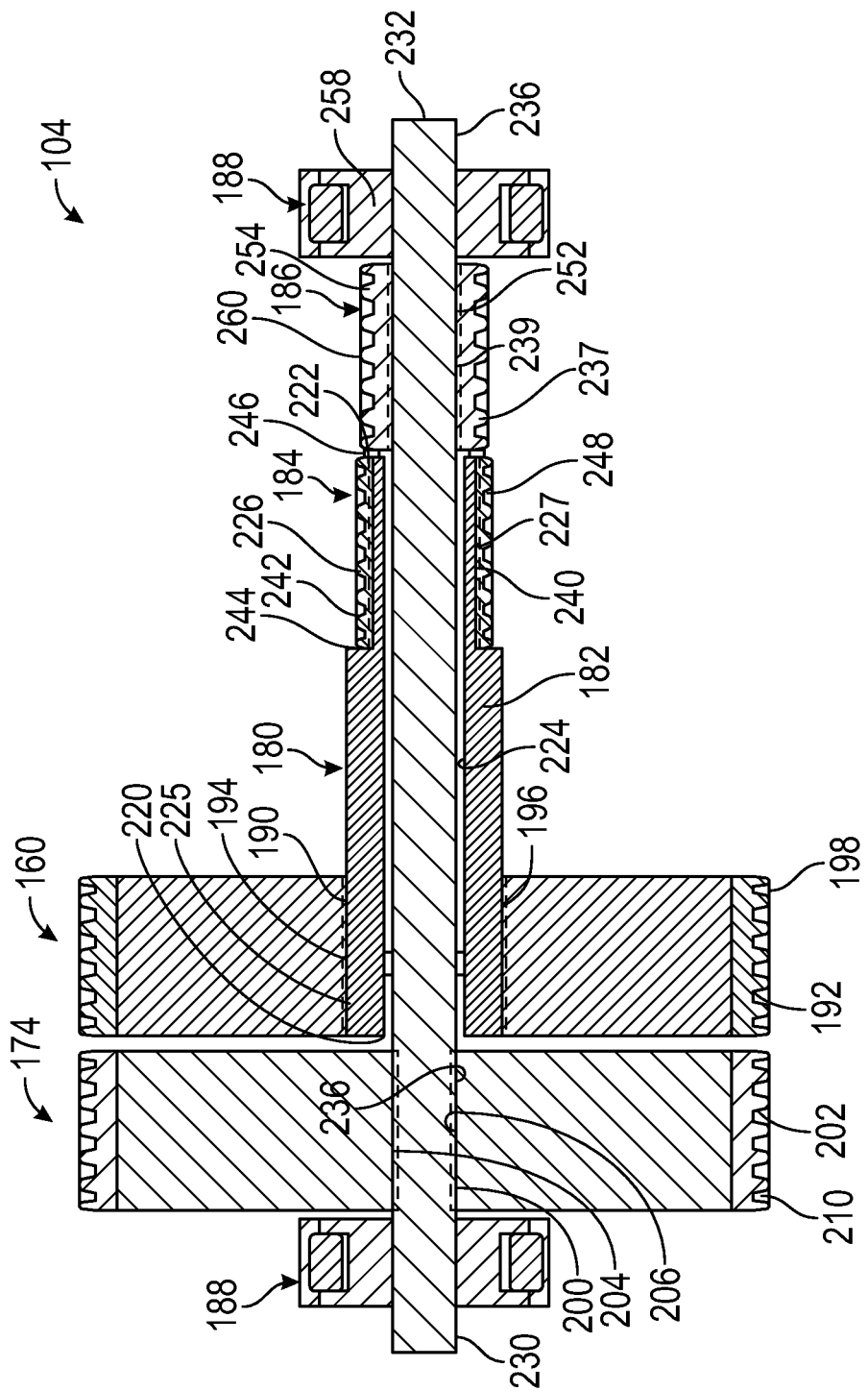
FIG. 4 is a cross-sectional view of a transfer shaft assembly of the low friction transmission system, taken along line 4-4 of FIG. 2.

With reference to FIG. 4, the first helical gear 160 is coupled to the outer transfer shaft 180. The first helical gear 160 is composed of a metal or metal alloy, and may be forged, cast, additively manufactured, etc. The first helical gear 160 has a first gear inner diameter 190 and a first gear outer diameter 192. The first gear inner diameter 190 is coupled to or integrally formed with the outer transfer shaft 180, and drives the outer transfer shaft 180. In one example, the first gear inner diameter 190 includes a plurality of mating splines 194, which mate with a plurality of splines 196 of the outer transfer shaft 180 to fixedly couple the first helical gear 160 to the outer transfer shaft 180. In one example, the first helical gear 160 has a plurality of helical gear teeth 198. The helical gear teeth 198 are coupled to or defined on the first gear outer diameter 192. With reference back to FIG. 2, the first helical gear 160 has a center axis C3, and the helical gear teeth 198 are arranged at the second helix angle 172 defined between the center axis C3 and a line tangent to one tooth of the helical gear teeth 198. The first helical gear 160 is driven by the first pinion gear 116, and drives the outer transfer shaft 180.

With reference back to FIG. 4, the second helical gear 174 is coupled to the inner transfer shaft 182. The second helical gear 174 is composed of a metal or metal alloy, and may be forged, cast, additively manufactured, etc. The second helical gear 174 has a second gear inner diameter 200 and a second gear outer diameter 202. The second gear inner diameter 200 is coupled to the inner transfer shaft 182, and drives the inner transfer shaft 182. The second gear inner diameter 200 includes a plurality of second mating splines 204, which mate with a plurality of second splines 206 of the inner transfer shaft 182 to fixedly couple the second helical gear 174 to the inner transfer shaft 182. In one example, the second helical gear 174 has a plurality of second helical gear teeth 210. The second helical gear teeth 210 are defined on the second gear outer diameter 202. With reference back to FIG. 2, the second helical gear 174 has a center axis C4, and the second helical gear teeth 210 are arranged at the first helix angle 158 defined between the center axis C4 and a line tangent to one tooth of the second helical gear teeth 210. The second helical gear 174 is driven by the second pinion gear 118, and drives the inner transfer shaft 182. By providing the first helical gear 160 with the second helix angle 172 opposite and equal to the second helical gear 174 with the first helix angle 158, an axial load acting on the transfer shaft assembly 104 is reduced or canceled due to the opposite orientation of the first helix angle 158 and the second helix angle 172. By eliminating or canceling the axial load acting on the transfer shaft assembly 104, the first helical gear 160 and the second helical gear 174 reduce mechanical friction associated with the transfer shaft assembly 104.

The outer transfer shaft 180 includes a first transfer shaft end 220 and an opposite second transfer shaft end 222. The outer transfer shaft 180 also defines a central transfer bore 224 from the first transfer shaft end 220 to the second transfer shaft end 222, which is sized to receive the inner transfer shaft 182 therethrough. The central transfer bore 224 is an inner diameter of the outer transfer shaft 180, and the plurality of splines 196 are defined about an outer diameter 225 of the outer transfer shaft 180. The outer transfer shaft 180 is composed of a metal or metal alloy, and may be forged, extruded, cast, etc. In this example, the outer transfer shaft 180 has a different, larger diameter than the inner transfer shaft 182 to enable the inner transfer shaft 182 to be rotatable within and rotatable independent of the outer transfer shaft 180. The first helical gear 160 is coupled to the first transfer shaft end 220 of the outer transfer shaft 180, and the first transfer pinion 184 is coupled to the second transfer shaft end 222 of the outer transfer shaft 180. In one example, the second transfer shaft end 222 includes a plurality of transfer splines 226 about the outer diameter 225, which mate with a plurality of pinion splines 227 to couple the first transfer pinion 184 to the second transfer shaft end 222 of the outer transfer shaft 180.

The inner transfer shaft 182 includes a third transfer shaft end 230 and an opposite fourth transfer shaft end 232. The inner transfer shaft 182 also defines a second central transfer bore 234 from the third transfer shaft end 230 to the fourth transfer shaft end 232, which reduces a weight associated with the inner transfer shaft 182. The plurality of second splines 206 are defined about an outer diameter 236 of the inner transfer shaft 182. The inner transfer shaft 182 is composed of a metal or metal alloy, and may be forged, extruded, cast, etc. In this example, the inner transfer shaft 182 is received through and is rotatable within the outer transfer shaft 180. The second helical gear 174 is coupled to the third transfer shaft end 230 of the inner transfer shaft 182 via the second splines 204, 206, and the second transfer pinion 186 is coupled to the fourth transfer shaft end 232 of the inner transfer shaft 182. In one example, the fourth transfer shaft end 232 includes a plurality of second transfer splines 237 about the outer diameter 236, which mate with a plurality of second pinion splines 239 to couple the second transfer pinion 186 to the fourth transfer shaft end 232 of the inner transfer shaft 182.

The first transfer pinion 184 is coupled to the outer transfer shaft 180. The first transfer pinion 184 is composed of a metal or metal alloy, and may be forged, cast, additively manufactured, etc. The first transfer pinion 184 has a first transfer pinion inner diameter 240 and a first transfer pinion outer diameter 242. The pinion splines 227 are defined on the first transfer pinion inner diameter 240. The first transfer pinion 184 also has a first transfer end 244 opposite a second transfer end 246, and a central pinion bore 245 is defined through the first transfer pinion 184 from the first transfer end 244 to the second transfer end 246. The first transfer pinion inner diameter 240 is sized to enable the inner transfer shaft 182 to rotate within and independent of the first transfer pinion 184. The second transfer end 246 is spaced apart from the second transfer pinion 186. In one example, the first transfer pinion 184 is a helical gear, and has a plurality of helical gear teeth 248 defined on the first transfer pinion outer diameter 242. With reference back to FIG. 2, the first transfer pinion 184 has a center axis C5, and the helical gear teeth 248 are arranged at the second helix angle 172 defined between the center axis C5 and a line tangent to one tooth of the helical gear teeth 248. The first transfer pinion 184 is driven by the outer transfer shaft 180, and drives the first helical differential gear 250 of the differential assembly 106.

With reference back to FIG. 4, the second transfer pinion 186 is coupled to the inner transfer shaft 182. The second transfer pinion 186 is composed of a metal or metal alloy, and may be forged, cast, additively manufactured, etc. The second transfer pinion 186 has a second transfer pinion inner diameter 252 and a second transfer pinion outer diameter 254. The second pinion splines 239 are defined on the second transfer pinion inner diameter 252 and couple the second transfer pinion 186 to the inner transfer shaft 182.

The second transfer pinion 186 also has a third transfer end 256 opposite a fourth transfer end 258. The third transfer end 256 is adjacent to the first transfer pinion 184 and inhibits or limits an axial movement of the outer transfer shaft 180 relative to the inner transfer shaft 182. The fourth transfer end 258 is spaced apart from one of the bearings 188. In one example, the second transfer pinion 186 is a helical gear, and has a plurality of second helical gear teeth 260 defined on the second transfer pinion outer diameter 254. With reference back to FIG. 2, the second transfer pinion 186 has a center axis C6, and the second helical gear teeth 260 are arranged at the first helix angle 158 defined between the center axis C6 and a line tangent to one tooth of the second helical gear teeth 260. The second transfer pinion 186 is driven by the inner transfer shaft 182, and drives the second helical differential gear 262 of the differential assembly 106. By providing the first transfer pinion 184 with the second helix angle 172 opposite and equal to the second transfer pinion 186 with the first helix angle 158, an axial load acting on the transfer shaft assembly 104 is reduced or canceled due to the opposite orientation of the first helix angle 158 and the second helix angle 172, and the torsional tuning of the inner shaft 110 and the outer shaft 22. By eliminating or canceling the axial load acting on the transfer shaft assembly 104, the first transfer pinion 184 and the second transfer pinion 186 reduce mechanical friction associated with the transfer shaft assembly 104.

In this example, the transfer shaft assembly 104 includes two bearings 188. One of the bearings 188 is coupled to the first transfer shaft end 220 of the outer transfer shaft 180, and the other bearing 188 is coupled to the second transfer shaft end 222 of the outer transfer shaft 180. The bearings 188 support the outer transfer shaft 180 for rotation. In this example, the bearings 188 are each roller bearings, however, any bearing may be employed, including, but not limited to ball bearings, etc. The bearings 188 may be coupled to the housing associated with the low friction transmission system 100.

The differential assembly 106 is coupled to the transfer shaft assembly 104. The transfer shaft assembly 104 transfers speed and torque to the differential assembly 106. In one example, the differential assembly 106 includes the first helical differential gear 250, the second helical differential gear 262, a differential gear set 270, a first output shaft 274, a second output shaft 276 and one or more bearings 278.

Figure 5:
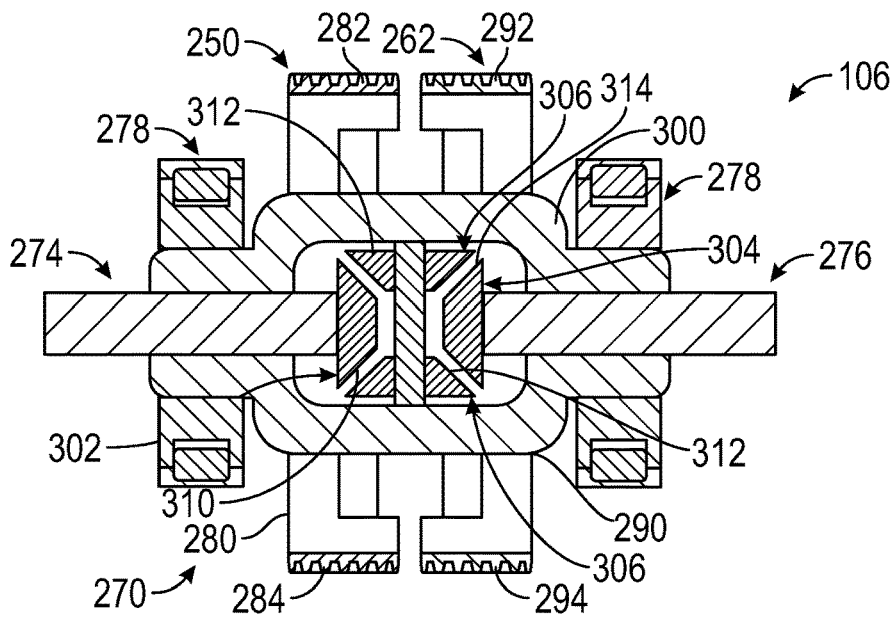
FIG. 5 is a cross-sectional view of a differential assembly of the low friction transmission system, taken along line 5-5 of FIG. 2.

The first helical differential gear 250 is coupled to the first transfer pinion 184, and is driven by the first transfer pinion 184. The first helical differential gear 250 is composed of a metal or metal alloy, and may be forged, cast, additively manufactured, etc. In one example, the first helical differential gear 250 is a helical ring gear. With reference to FIG. 5, the first helical differential gear 250 has a first differential gear inner diameter 280 and a first differential gear outer diameter 282. The first differential gear inner diameter 280 is coupled to the differential gear set 270, and cooperates with the second helical differential gear 262 to drive the differential gear set 270. The plurality of helical gear teeth 284 are defined on the first differential gear outer diameter 282. With reference back to FIG. 2, the first helical differential gear 250 has a center axis C7, and the helical gear teeth 284 are arranged at the first helix angle 158 defined between the center axis C7 and a line tangent to one tooth of the helical gear teeth 284.

The second helical differential gear 262 is coupled to the second transfer pinion 186, and is driven by the second transfer pinion 186. The second helical differential gear 262 is composed of a metal or metal alloy, and may be forged, cast, additively manufactured, etc. In one example, the second helical differential gear 262 is a helical ring gear. With reference to FIG. 5, the second helical differential gear 262 has a second differential gear inner diameter 290 and a second differential gear outer diameter 292. The second differential gear inner diameter 290 is coupled to the differential gear set 270, and cooperates with the first helical differential gear 250 to drive the differential gear set 270. The plurality of helical gear teeth 294 are defined on the second differential gear outer diameter 292. With reference back to FIG. 2, the second helical differential gear 262 has a center axis C8, and the helical gear teeth 294 are arranged at the second helix angle 172 defined between the center axis C8 and a line tangent to one tooth of the helical gear teeth 294. By providing the second helical differential gear 262 with the second helix angle 172 opposite and equal to the first helical differential gear 250 with the first helix angle 158, an axial load acting on the differential assembly 106 is reduced or canceled due to the opposite orientation of the first helix angle 158 and the second helix angle 172, and the torsional tuning of the inner shaft 110 and the outer shaft 22. By eliminating or canceling the axial load acting on the differential assembly 106, the first helical differential gear 250 and the second helical differential gear 262 reduce mechanical friction associated with the differential assembly 106.

With reference back to FIG. 5, in one example, the differential gear set 270 includes a carrier 300, a first sun gear 302, a second sun gear 304 and a pair of planet gears 306. The carrier 300 is coupled to each of the first helical differential gear 250 and the second helical differential gear 262. The carrier 300 is driven by the first helical differential gear 250 and the second helical differential gear 262. The carrier 300 is coupled to the planet gears 306. The rotation of the carrier 300 results in a rotation of the planet gears 306 as the planet gears 306 rotate about an axis of the carrier 300. The carrier 300 may have any desired shape, and is composed of metal or metal alloy. The carrier 300 may be cast, additively manufactured, forged, etc.

The first sun gear 302 is coupled to the first output shaft 274. In one example, the first sun gear 302 is a bevel gear, which includes a plurality of first bevel gear teeth 310. The first sun gear 302 is composed of metal or metal alloy, and may be cast, machined, forged, additively manufactured, etc. The first bevel gear teeth 310 engage with a plurality of planet bevel gear teeth 312 of the planet gears 306 such that a rotation of the planet gears 306 by the carrier 300 drives the first sun gear 302. The rotation of the first sun gear 302, in turn, rotates the first output shaft 274 to move or rotate the respective front wheel 16.

The second sun gear 304 is coupled to the second output shaft 276. In one example, the second sun gear 304 is a bevel gear, which includes a plurality of second bevel gear teeth 314. The second sun gear 304 is composed of metal or metal alloy, and may be cast, machined, forged, additively manufactured, etc. The second bevel gear teeth 314 engage with the planet bevel gear teeth 312 of the planet gears 306 such that a rotation of the planet gears 306 by the carrier 300 drives the second sun gear 304. The rotation of the second sun gear 304, in turn, rotates the second output shaft 276 to move or rotate the respective front wheel 16.

The planet gears 306 are each coupled to the carrier 300. In one example, each of the planet gears 306 is a bevel gear, and includes the planet bevel gear teeth 312. The planet gears 306 are each composed of metal or metal alloy, and may be cast, machined, forged, additively manufactured, etc. Each of the planet gears 306 drive the first sun gear 302 and the second sun gear 304. The planet gears 306 are each also coupled to the carrier 300 to be rotatable about a planet gear axis. The planet gears 306 are each rotatable about the planet gear axis by the first sun gear 302 or the second sun gear 304 in instances where the first output shaft 274 rotates at a different speed than the second output shaft 276, during a turning of the front wheel 16, for example.

The first output shaft 274 is coupled to the first sun gear 302. The first sun gear 302 is fixedly coupled to the first output shaft 274 such that a rotation of the first sun gear 302 drives the first output shaft 274. The first output shaft 274 is composed of metal or metal alloy, and is cast, machined, forged, etc. The first output shaft 274 is coupled to a respective front wheel 16.

The second output shaft 276 is coupled to the second sun gear 304. The second sun gear 304 is fixedly coupled to the second output shaft 276 such that a rotation of the second sun gear 304 drives the second output shaft 276. The second output shaft 276 is composed of metal or metal alloy, and is cast, machined, forged, etc. The second output shaft 276 is coupled to a respective front wheel 16.

In this example, the differential assembly 106 includes two bearings 278. One of the bearings 278 is coupled to the carrier 300 proximate the first output shaft 274, and the other bearing 278 is coupled to the carrier 300 proximate the second output shaft 276. In this example, the bearings 278 are each roller bearings, however, any bearing may be employed, including, but not limited to ball bearings, etc. The bearings 278 support the carrier 300 for rotation. The bearings 278 may be coupled to the housing associated with the low friction transmission system 100.

In one example, with reference to FIG. 2, in order to assemble the low friction transmission system 100, with the coupling point 112 of the inner shaft 110 and the outer shaft 22 predetermined, the inner shaft 110 is coupled to the outer shaft 22 of the propulsion system 20 at the coupling point 112. The first pinion gear 116 and the second pinion gear 118 are coupled to the inner shaft 110. The bearings 114 are coupled to the outer shaft 22. The coupling system 120 is coupled to the inner shaft 110 to fixedly couple the inner shaft 110 to the outer shaft 22. The inner transfer shaft 182 is positioned within the outer transfer shaft 180. The first helical gear 160 is coupled to the outer transfer shaft 180, and the first transfer pinion 184 is coupled to the outer transfer shaft 180. The second helical gear 174 is coupled to the inner transfer shaft 182, and the second transfer pinion 186 is coupled to the inner transfer shaft 182. The bearings 188 are coupled to the inner transfer shaft 182. The differential gear set 270 is assembled with the planet gears 306 coupled to the carrier 300, and the first helical differential gear 250 is coupled to the carrier 300. The second helical differential gear 262 is coupled to the carrier 300. The output shafts 274, 276 are coupled to a respective front wheel 16. One or more housings may be coupled about the low friction transmission system 100 to enclose the low friction transmission system 100, if desired.

Figure 6:
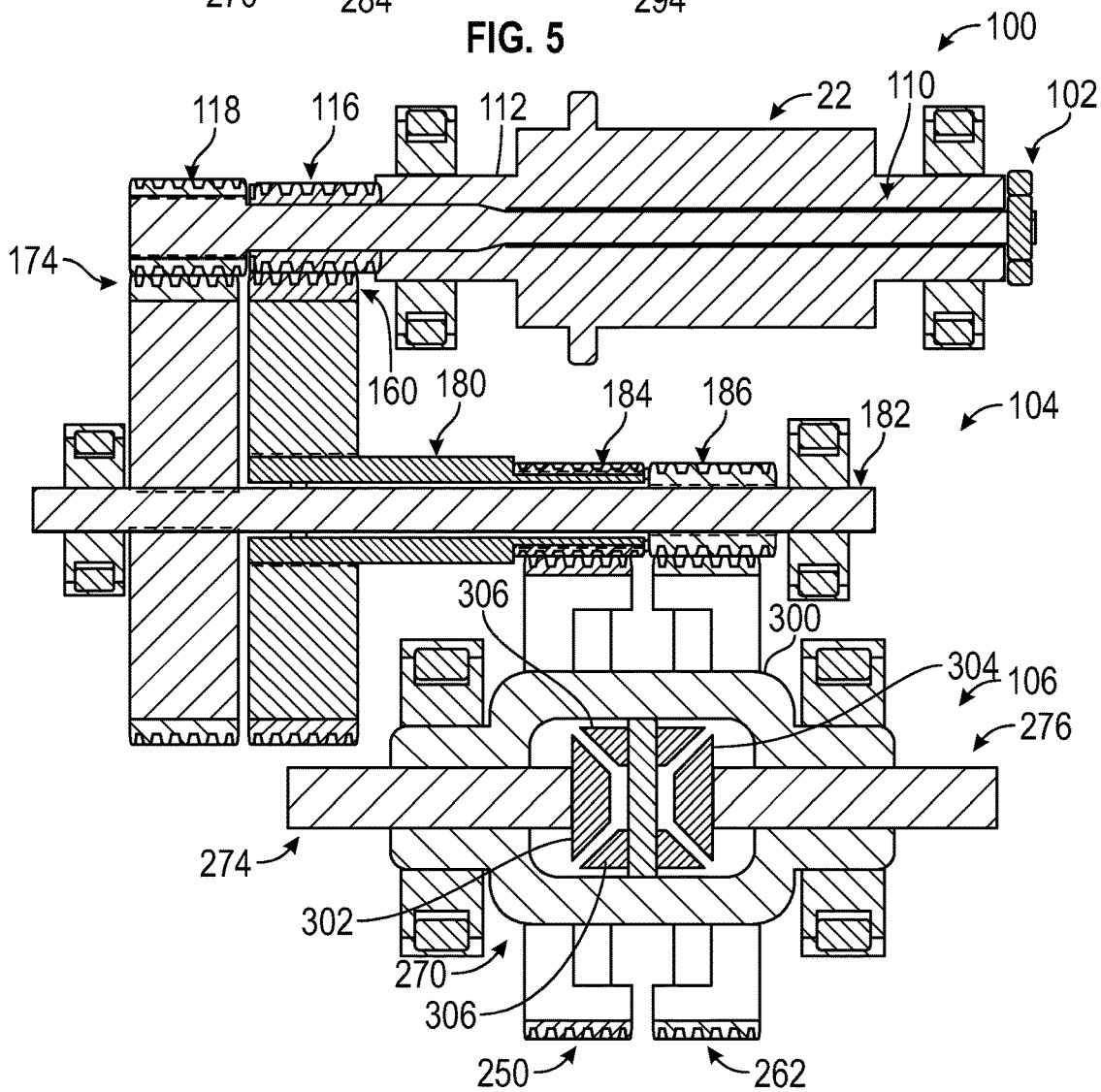
FIG. 6 is a cross-sectional view of the low friction transmission system, with the cross-sectional view of the input shaft assembly taken along line 3-3 of FIG. 2, the cross-sectional view of the transfer shaft assembly taken along line 4-4 of FIG. 2, and the cross-sectional view of the differential assembly taken along line 5-5 of FIG. 2.

With the low friction transmission system 100 assembled to the propulsion system and coupled to the front wheels 16, as the propulsion system 20 drives the outer shaft 22, with reference to FIG. 6, the inner shaft 110 rotates at the same speed and with the same torque as the outer shaft 22. The rotation of the inner shaft 110 drives the first pinion gear 116 and the second pinion gear 118. The rotation of the first pinion gear 116 drives the first helical gear 160, which in turn, drives the outer transfer shaft 180. The rotation of the second pinion gear 118 drives the second helical gear 174, which in turn, drives the inner transfer shaft 182. The rotation of the outer transfer shaft 180 drives the first transfer pinion 184, which in turn, drives the first helical differential gear 250. The rotation of the inner transfer shaft 182 drives the second transfer pinion 186, which in turn, drives the second helical differential gear 262. The rotation of the first helical differential gear 250 and the second helical differential gear 262 rotates the carrier 300. The rotation of the carrier 300 rotates the planet gears 306, which in turn, rotates the first sun gear 302 and the second sun gear 304. The rotation of the first sun gear 302 drives the first output shaft 274, which causes a rotation of the respective front wheel 16. The rotation of the second sun gear 304 drives the second output shaft 276, which causes a rotation of the respective front wheel 16.

As the inner shaft 110 is coupled to the outer shaft 22 at the coupling point 112 predetermined based on the torsional tuning of the low friction transmission system 100, with reference back to FIG. 2, the first pinion gear 116 and the second pinion gear 118 cooperate to cancel axial loads acting on the input shaft assembly 102 due to the opposite first helix angle 158 and the second helix angle 172; the first helical gear 160, the second helical gear 174, the first transfer pinion 184 and the second transfer pinion 186 cooperate to cancel axial loads acting on the transfer shaft assembly 104 due to the respective opposite first helix angle 158 and the second helix angle 172; and the first helical differential gear 250 and the second helical differential gear 262 cooperate to cancel axial loads acting on the differential assembly 106 due to the opposite first helix angle 158 and the second helix angle 172. By canceling the axial loads acting on the input shaft assembly 102, the transfer shaft assembly 104 and the differential assembly 106, mechanical friction is reduced, which improves an efficiency of the low friction transmission system 100. By improving the efficiency of the low friction transmission system 100, a range of the electric motor associated with the propulsion system 20 may be increased or smaller batteries may be employed to power the propulsion system 20. In addition, the use of the helical gears 116, 118, 160, 174, 184, 186, 250, 262 may reduce noise associated with the operation of the low friction transmission system 100 as helical gears are generally quieter in operation than other gears, such as spur gears.

It should be noted that while the low friction transmission system 100 is described herein as including a plurality of torsionally tuned shafts, the low friction transmission system 100 may be configured differently to transfer torque from the propulsion system 20 to the front wheels 16. For example, with reference to FIG. 7, a low friction transmission system 400 is shown. As the low friction transmission system 400 includes components that are the same or substantially similar to components discussed with regard to the low friction transmission system 100 of FIGS. 1-6, the same reference numerals will be used to denote the same or substantially similar components.

Figure 7:
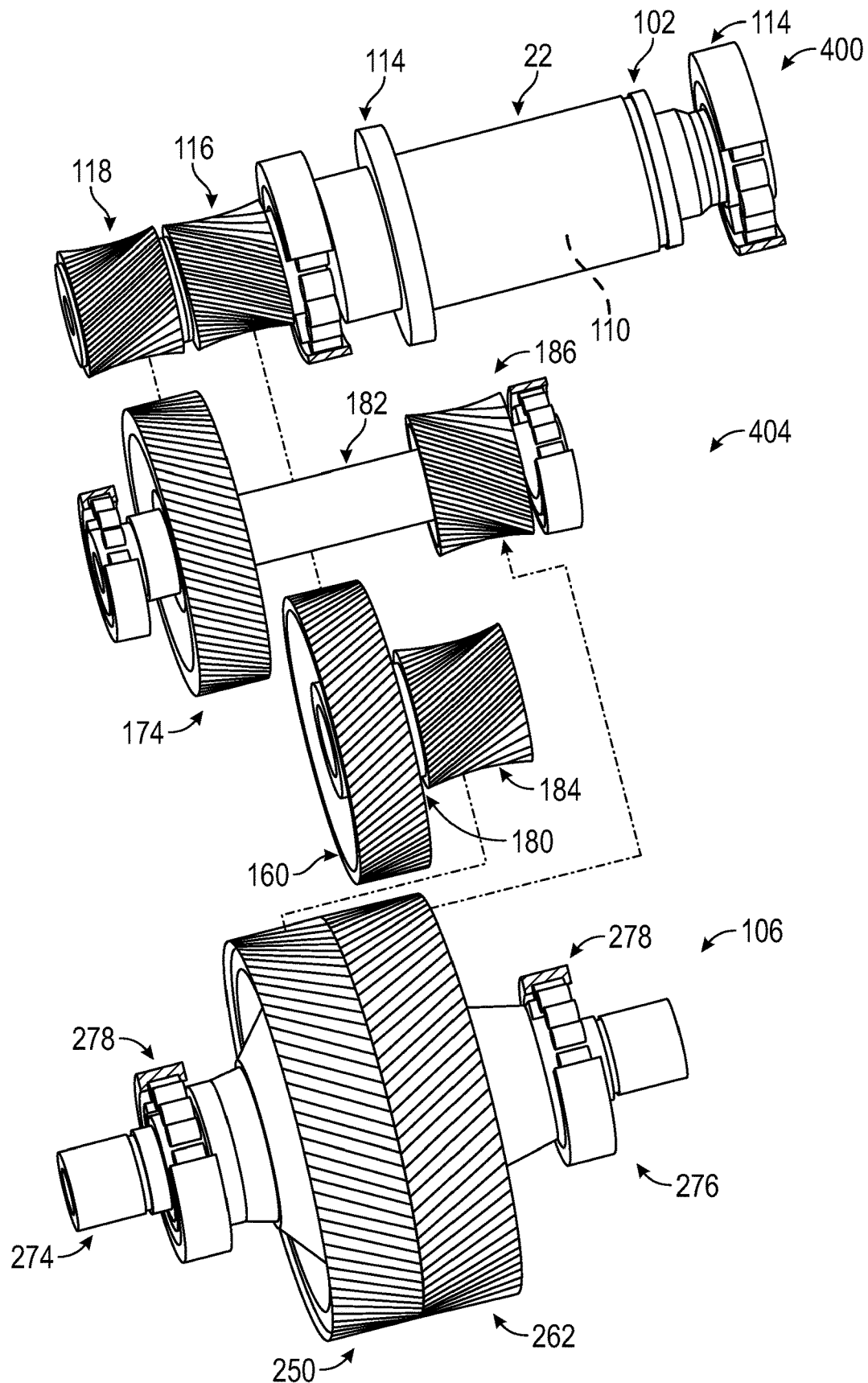
FIG. 7 is a partially exploded perspective view of another exemplary low friction transmission system for use with the vehicle of FIG. 1 in accordance with various embodiments.

In one example, the low friction transmission system 400 includes the input shaft assembly 102, a transfer shaft assembly 404 and the differential assembly 106. The low friction transmission system 400 may also include a housing to enclose the components of the low friction transmission system 400. The input shaft assembly 102 receives input torque from the propulsion system 20. In the example of FIG. 7, the low friction transmission system 400 includes the input shaft assembly 102 and the differential assembly 106, which are torsionally tuned and axially balanced such that axial loads acting on the input shaft assembly 102 and the differential assembly 106 are substantially canceled to reduce the friction associated with the low friction transmission system 400. The transfer shaft assembly 404 is coupled between the input shaft assembly 102 and the differential assembly 106. The transfer shaft assembly 404 transfers speed and torque from the input shaft assembly 102 to the differential assembly 106. In one example, the transfer shaft assembly 404 includes the first helical gear 160, the second helical gear 174, the outer transfer shaft 180, the inner transfer shaft 182, the first transfer pinion 184, the second transfer pinion 186 and the bearings 188. In this example, the inner transfer shaft 182 is not positioned within the outer transfer shaft 180, but rather is spaced apart from the first transfer shaft 182.

As the assembly and use of the low friction transmission system 400 is substantially the same as the assembly and use of the low friction transmission system 100 discussed with regard to FIGS. 1-6, the differences in the assembly and use of the low friction transmission system 400 will be briefly discussed. In the example of the low friction transmission system 400, with the input shaft assembly 102 assembled, the first helical gear 160 and the first transfer pinion 186 are coupled to the outer transfer shaft 180. The second helical gear 174 and the second transfer pinion 186 are coupled to the inner transfer shaft 182. The first helical gear 160 is coupled to the first pinion gear 116, and the first transfer pinion 184 is coupled to the second helical differential gear 262 to transfer torque from the input shaft assembly 102 to the differential assembly 106. The second helical gear 174 is coupled to the second pinion gear 118, and the second transfer pinion 186 is coupled to the first helical differential gear 250 to transfer torque from the input shaft assembly 102 to the differential assembly 106.

In addition, it should be noted that while the propulsion system 20 is described herein as including a single electric motor that drives the outer shaft 22, in other embodiments, the propulsion system 20 may include multiple electric motors, such as two electric motors. In the example of the propulsion system 20 including two electric motors, the first electric motor may include the outer shaft 22 and the inner shaft 110, which is coupled to the first pinion gear 116 to drive the first pinion gear 116, while the output shaft of the second electric motor may be coupled to the second pinion gear 118 to drive the second pinion gear 118. In the example of the use of two electric motors, the differential assembly 106 may be eliminated, and the first helical differential gear 250 may directly drive the first output shaft 274 and the second helical differential gear 262 may directly drive the second output shaft 276. Axial loads are canceled through this arrangement, and since the left and right wheels 16 are now disconnected, advanced features like torque vectoring may be possible.

It should be noted that while the low friction transmission system 100, 400 is described herein as including the splines 126, 127, 131, 194, 196, 204, 206, 226, 227, 237, 239, the splines 126, 127, 131, 194, 196, 204, 206, 226, 227, 237, 239 may be optional. For example, the splines 126, 127, 131, 194, 196, 204, 206, 226, 227, 237, 239 may be employed with the low friction transmission system 100, 400 in a high torque application.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A transmission system for a vehicle, comprising:
a first helical pinion gear having a helix angle coupled to a first shaft and configured to receive an input torque;
a second helical pinion gear having a first helix angle coupled to a second shaft and configured to receive the input torque, the second shaft disposed within the first shaft and rotatable within the first shaft; and
a differential assembly including a third helical gear having the first helix angle coupled to the first helical pinion gear, a fourth helical gear having the helix angle coupled to the second helical pinion gear, the third helical gear and the fourth helical gear coupled to a differential gear set to drive a first output shaft and a second output shaft associated with the vehicle.

2. The transmission system of claim 1, further comprising an input shaft assembly coupled to a propulsion system associated with the vehicle, and the input shaft assembly is configured to provide the input torque.

3. The transmission system of claim 2, wherein the first shaft further comprises a first helical gear coupled to the input shaft assembly to receive the input torque, and the first helical gear has the helix angle.

4. The transmission system of claim 3, wherein the input shaft assembly includes an input shaft and an output shaft, and the input shaft includes a third helical pinion gear having the first helix angle coupled to the first helical gear.

5. The transmission system of claim 2, wherein the second shaft further comprises a second helical gear coupled to the input shaft assembly to receive the input torque, and the second helical gear has the helix angle.

6. The transmission system of claim 5, wherein the input shaft assembly includes an input shaft and an output shaft, and the input shaft includes a fourth helical pinion gear having the helix angle coupled to the second helical gear.

7. The transmission system of claim 2, wherein the input shaft assembly includes an input shaft disposed within an output shaft, the output shaft is associated with the propulsion system of the vehicle, and the input shaft is configured to rotate with the output shaft at the same speed as the input shaft.

8. The transmission system of claim 7, wherein the input shaft includes a third helical pinion gear having the helix angle and a fourth helical pinion gear having the first helix angle.

9. The transmission system of claim 7, wherein the input shaft includes a plurality of splines that engage a central bore of the output shaft to couple the input shaft to the output shaft.

10. The transmission system of claim 1, wherein the helix angle and the first helix angle are opposite and equal angles.

11. A vehicle, comprising:
a propulsion system having an output shaft;
a transmission system including:
an input shaft assembly coupled to the output shaft;
a transfer shaft assembly coupled to the input shaft assembly, the transfer shaft assembly including a first transfer shaft having a first helical gear configured to be driven by the input shaft assembly and a first helical pinion gear, and a second transfer shaft having a second helical gear configured to be driven by the input shaft assembly and a second helical pinion gear, the first helical gear and the first helical pinion gear having a helix angle, and the second helical gear and the second helical pinion gear having a first helix angle; and
a differential assembly coupled to the transfer shaft assembly, the differential assembly including a third helical gear and a fourth helical gear coupled to a differential gear set, the third helical gear configured to be driven by the first helical pinion gear and the fourth helical gear configured to be driven by the second helical pinion gear, the differential gear set configured to drive a first output shaft and a second output shaft.

12. The vehicle of claim 11, wherein the helix angle and the first helix angle are opposite and equal angles.

13. The vehicle of claim 11, wherein the third helical gear has the first helix angle and the fourth helical gear has the helix angle.

14. The vehicle of claim 11, wherein the input shaft assembly includes an input shaft disposed within the output shaft, and the input shaft is configured to rotate with the output shaft at the same speed as the input shaft.

15. The vehicle of claim 14, wherein the input shaft is coupled to the output shaft at a coupling point to transfer power from the output shaft to the input shaft.

16. The vehicle of claim 14, wherein the input shaft includes a third helical pinion gear having the helix angle and a fourth helical pinion gear having the first helix angle.

17. The vehicle of claim 16, wherein the third helical pinion gear is configured to drive the first helical gear.

18. The vehicle of claim 16, wherein the fourth helical pinion gear is configured to drive the second helical gear.

19. The vehicle of claim 14, wherein the input shaft includes a plurality of splines that engage a central bore of the output shaft to couple the input shaft for rotation with the output shaft.

20. The vehicle of claim 11, wherein the second transfer shaft is positioned within a central transfer bore of the first transfer shaft.

* * * * *